Patented Apr. 27, 1948

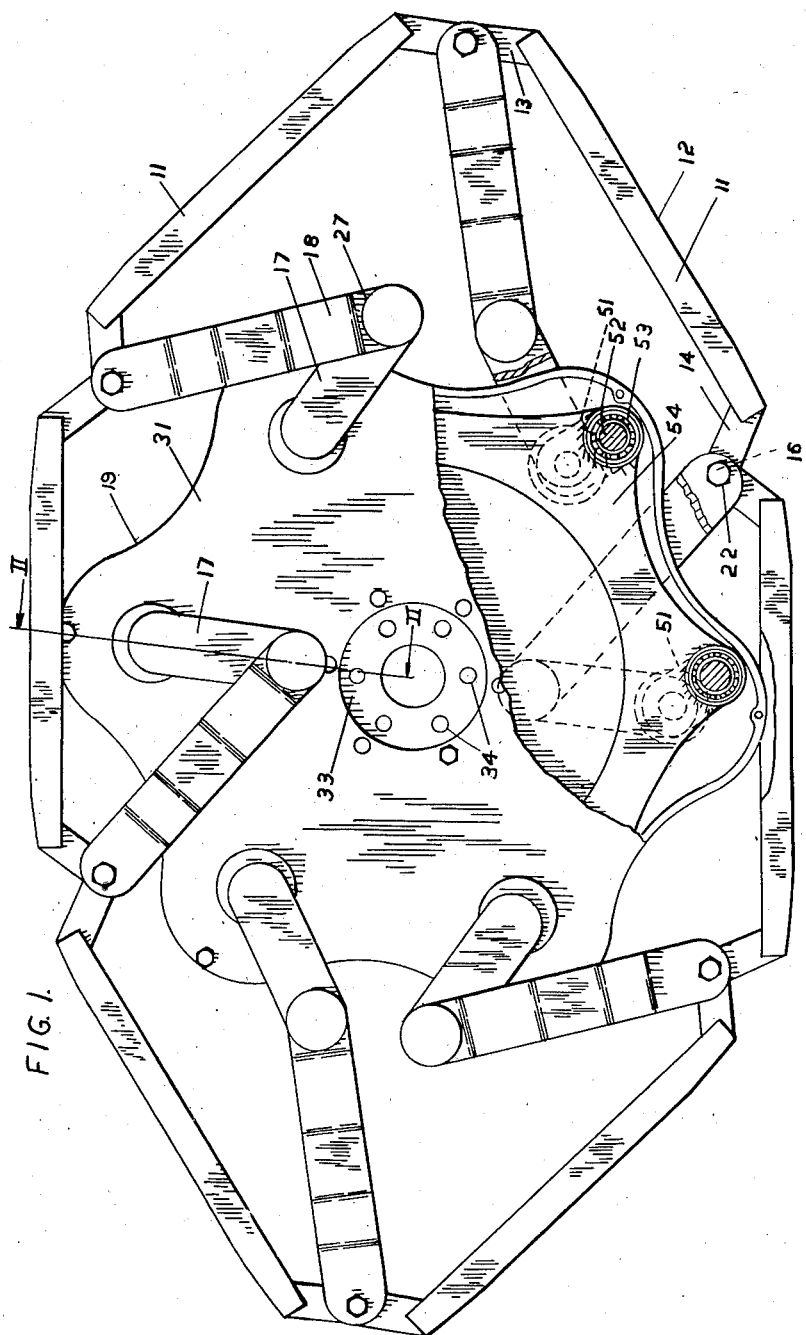

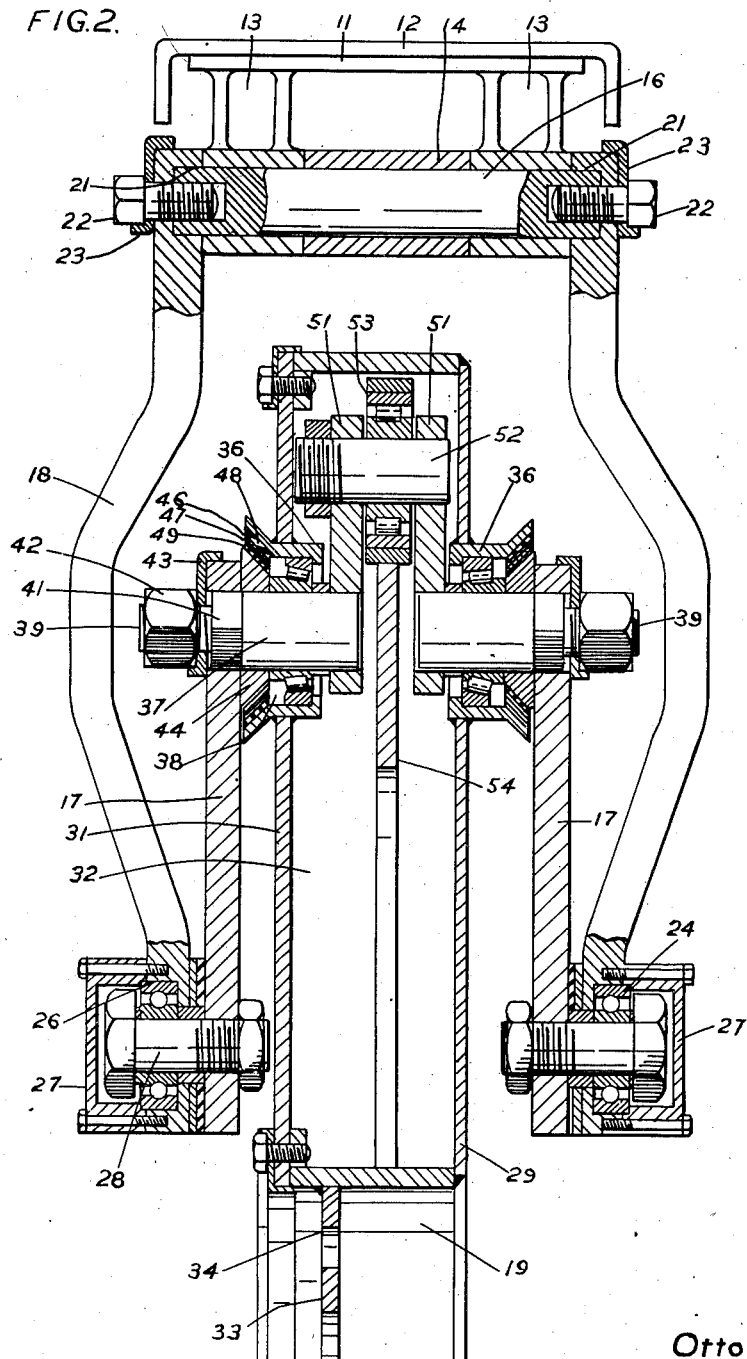

2,440,417

UNITED STATES PATENT OFFICE 2,440,417

TRACK WHEEL FOR VEHICLES

Otto Singer, London, England

Application February 25, 1947, Serial No. 730,698
In Great Britain March 16, 1946

5 Claims. (Cl. 305—6)

This invention relates to track wheel for vehicles, that is to say wheels which lay a track on the ground increasing the area of support or contact as compared with that of a normal wheel.

It is an object of this invention to provide a track wheel which will be equivalent to a wheel of large diameter rolling on the ground, and capable of transmitting a powerful tractive effort in the case of a driven wheel.

Another object is to provide a simple mechanical construction avoiding the necessity for gearing or chains while connecting the moving parts together by linkages which ensure the maintenance of the required angular relationships between them.

Yet another object is to provide a construction in which there are no sliding parts which are liable to be obstructed by caked deposits, mud and the like.

In many constructions hitherto used a track which is laid consists of linked elements on which wheels supporting the vehicle roll forward. Such track layers are noisy in use and have other disadvantages.

According to the invention a track wheel has track sections hinged together and connected at intervals by links to pivoted cranks while means are provided for maintaining arms or equivalent members, fixedly associated with the cranks in mutually parallel relationship.

A simple form of track wheel according to the present invention comprises a hub which turns on its central axis and carries a number of cranks, rotating on crank shafts spaced apart around the central axis, each crank being linked to a joint in the track sections which track sections are joined together so as to form a continuous track. Each track section is generally curved to a large radius on its tread surface although the form of the curve may be varied. The track sections may be rigid or to some extent flexible, and they may be provided with tread surfaces which are roughened for agricultural purposes, or may have treads of rubber or the like for running on roads. The crankshafts carry also additional cranks or arms or equivalent members provided with pivots by which they are interconnected by a substantially rigid body such as a ring or star-shaped member so as to maintain them in mutually parallel relationship as they rotate. The angular relation between each crank and arm varies progressively round the hub so that the track may assume a flattened form with its longer axis approximately parallel to the ground, and thus proceed as the hub rotates so that its centre remains at a substantially uniform height above the ground. The difference in angle between adjacent cranks and arms is generally equal to three hundred and sixty degrees divided by the number of cranks. For example the progressive change in angle is sixty degrees in the case of six cranks, and forty five degrees in the case of eight cranks. The track wheel may have any other numbers of track sections, either an even or an odd number, subject of course to the degree of mechanised complexity involved.

The invention is illustrated by way of example in the accompanying drawings in which:

Figure 1 is an elevation of a linked track wheel with part of the hub cover broken away to show the arms connected to the ring, and Figure 2 is an end elevation in section drawn to a larger scale and taken on the line II—II in Fig. 1.

In this example, a simple construction of track wheel is described in which there are six equal track sections 11, each provided with a tread surface 12 preferably curved to a radius corresponding with that of the large wheel to which the construction is equivalent. Each track section is further provided with a pair of lugs 13 at one end and a single lug 14 at the other so that they interlock one with the other and are joined in a continuous chain by pivots or hinges 16 each of which passes through the pair of lugs 13 of one track section and through the single lug 14 of the next. The track is connected to an axle of a vehicle (not shown) by a symmetrical arrangement in which a system of outer cranks 17 and links 18 connecting the pivots to a hub 19 attached to the axle is duplicated on the two sides of the hub with the object of eliminating avoidable stresses in the connecting members. A pair of links 18 is accordingly freely pivoted to each pivot 16 joining the track sections 11, each link having a bearing recess 21 fitting over one end of a pivot and retained thereon by the head of a bolt 22 which is threadedly engaged in the pivot and prevented from turning by a locking tag 23. The other end of each link carries a ball bearing 24 which is retained in a recess 26 in the link by a dust cap 27 bolted to the link, and which bears on a pin 28 secured in an outer crank 17. Two such outer cranks 17 associated with each pair of links 18 are arranged so as to rotate in parallel relationship about one of six axes fixed relative to the hub, equidistant from each other and from the centre of the hub.

The hub comprises a crank case 29 and cover 31 together enclosing a toroidal space 32 of rectangular cross section and a flange 33 which is welded to the inner external surface of the crank case and provided with fixing holes 34 for connection with an axle. The crank case 29 and cover 31 are provided with bearing housings 36 arranged concentric with each of the six axes of rotation of the outer cranks 17. Each crank shaft 37, mounted at one of the positions by tapered roller bearings 38 in the bearing housings 36 of the crank case and cover, comprises a pair of coaxial stub shafts having projecting ends 39 either side of the hub provided with square shanks on which are held the ends of corresponding outer cranks 17. The ends referred to are of course those remote from the ends connected to the links 18, and they are retained on the stub shafts by nuts 42 on threaded ends 39 of the stub shafts extending from the square shanks. Locking tags 43 are provided to hold the nuts tightly engaged.

It may be mentioned that a seal for excluding dirt from the tapered roller bearings comprises a pair of conical washers 46 and 47 of hardened steel sandwiched between conical rubber washers 48 and 49 the outer one 48 of which rests against an internal conical surface in the bearing housing 36 while the inner one rests against an external conical surface on a collar 44 surrounding the stub shaft. Since the coefficient of friction between steel and steel is less than that between rubber and steel, relative rotation will take place between the steel washers which will provide an effective seal on account of their flexibility and resilient support. If desired the rubber washers may be vulcanized to their respective supports.

The adjacent ends of the coaxial stub shafts are fixed to inner cranks 51 which have a crank pin 52 extending fixedly between them providing a support for a ball bearing 53 mounted in a ring or spider 54 which encircles the torodial space in the hub. The ring has six such bearings mounted evenly about a common centre.

Having now described the principal components of the track wheel, it will be convenient to give some account of their relative disposition and mode of operation. Like elements mentioned, being respectively the track sections 11, links 18, outer cranks 17 and inner cranks 51 are of the same length, the only distinguishing feature being that at the six positions around the hub, the inner and outer cranks are fixed together in relatively different angular relationship. The bearings 38 in the hub and the bearings 53 in the ring 54 are spaced equally on equal pitch circles so that the inner cranks between them all must lie parallel in any position, whereas the outer cranks 17 are arranged so that when one crankshaft lies vertically below the centre of the hub, the pair of outer cranks 17 secured to it extends vertically upward and the pair of outer cranks 17 on the diametrically opposed crankshaft 37 extends vertically downward. The remaining outer cranks 17 on each side of the centre converge, each outer crank being inclined to the vertical at an angle of sixty degrees. In other words, starting from the bottom crankshaft 37 and going around the hub in an anticlockwise direction, each pair of cranks 17 is advanced through an angle of sixty degrees in a clockwise direction with respect to the previous one. This angular relationship must hold good irrespective of the angular position of the hub.

It will be seen from Fig. 1 that a downward load on the axle directed toward the track supporting surface must cause the track wheel to assume a configuration of stable equilibrium in which the track sections follow approximately an ellipse whose major axis lies substantially parallel to the supporting surface. The hub 19 carrying the cranks rotates but its centre remains at a substantially uniform height above the ground as it travels over the track sections 11 which bear on the ground at any time. The cranks are however controlled by their linkages so that they rotate in a direction opposite to that of the hub at the same mean speed.

The curvature of the treads has been mentioned as having a radius corresponding approximately with that of the large wheel to which the device is equivalent. Actually the curvature is not truly circular but is a rolling curve approximating to a circular curve with the object of providing a more uniform motion. The links 18, instead of being connected to the hinge pivots 16, may be connected to the respective track sections 11 near to such hinge pivots.

The track wheel may be a supporting wheel only, or it may be positively driven through its hub 19, for example.

I claim:

1. A track wheel comprising a hub member, a plurality of track sections jointed together and constituting an endless track, a plurality of crank shafts disposed in spaced relation around the axis of said hub member, outer cranks on said crank shafts displaced in their relative angular positions successively around said hub member, links extending from points adjacent the joints between said track sections to said outer cranks, and means for causing said crank shafts to rotate synchronously in one direction of rotation as said hub member rotates in the opposite direction, comprising inner cranks on said crank shafts so disposed as normally to extend parallel to one another, and means inter-connecting said inner cranks adapted to cause them to maintain said parallel relation.

2. A track wheel according to claim 1 wherein the means interconnecting said inner cranks comprises a substantially rigid spider to which each of said inner cranks is connected.

3. A track wheel comprising a hub member, a plurality of track sections jointed together and constituting an endless track, a plurality of crank shafts disposed in spaced relation around the axis of said hub member, outer cranks on the ends of said crank shafts at each side of said hub member, the outer cranks on each such crank shaft being angularly displaced relatively to the outer cranks on other crank shafts, at either side thereof around said hub member, links extending from both ends of the joints between said track sections to said outer cranks, inner cranks on said crank shafts normally extending parallel to one another and means interconnecting said inner cranks adapted to maintain their parallel relationship as said hub rotates.

4. A track wheel comprising a hub member, a plurality of track sections with means jointing them together end to end constituting an endless track, a plurality of crank shafts disposed in spaced relation around the axis of said hub member, each such crank shaft having a pair of cranks one crank at each end thereof, the cranks of one crankshaft being angularly displaced relatively to those of adjacent crank shafts around said hub member, a pair of links extending from adjacent each joint in said track sections to the cranks of a corresponding crank shaft at each side of said hub member, an inner crank on each said crank shaft, said inner cranks being normally all parallel to one another, and an annular member extending around said hub and interconnecting all of said inner cranks whereby to maintain their parallel relationship as said hub rotates.

5. A track wheel according to claim 1 having said outer cranks and links duplicated at each side of said hub member, the hub member itself comprising a crank case enclosing both said inner cranks and the means interconnecting the same, bearings in said crank case through which said crank shafts extend toward either side thereof, said outer cranks being affixed to the projecting ends of said crankshafts outside said crank case.

OTTO SINGER.